Patented Sept. 15, 1931

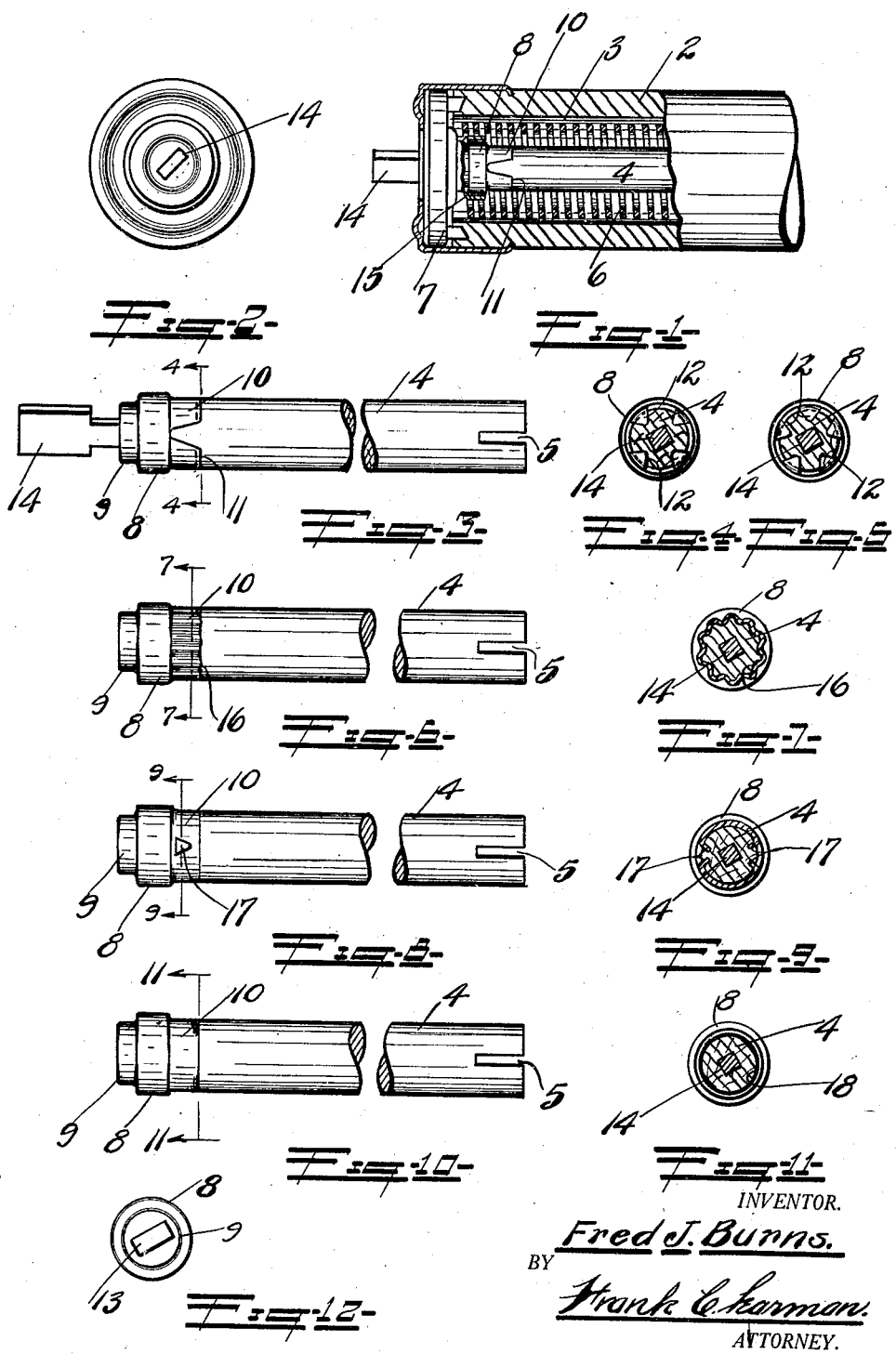

1,822,874

UNITED STATES PATENT OFFICE

FRED J. BURNS, OF SAGINAW, MICHIGAN, ASSIGNOR TO THE COLUMBIA MILLS, INC., OF SAGINAW, MICHIGAN, A CORPORATION OF NEW YORK

SPINDLE-FERRULE BEARING

Application filed January 31, 1930. Serial No. 224,894.

This invention relates to spindle ferrule bearings for shade rollers and the like.

The prime object of the invention is to design a rugged and substantial self centering spindle ferrule bearing, which forms a bearing for the conventional spool, and which will run accurate and true.

Another object of the invention is to provide a simple ferrule bearing and provide means on the bearing for snugly, firmly, and rigidly securing it on the spindle, so that it will withstand the torsional strains and hard usage to which these members are subjected.

A further object is to provide a bearing which can be a punch and die operation, which is simple to manufacture, and which can be assembled and secured on the spindle with a minimum of time and by unskilled labor.

The above and other objects will appear as the specification progresses, it being understood that changes may be made in the device within the scope of what is claimed, without departing from the spirit, or sacrificing any of the advantages thereof.

In the drawings:

Fig. 1 is a part sectional view of a shade roller, parts being broken away to show the invention to which this application is directed.

Fig. 2 is an end view.

Fig. 3 is an enlarged detail view of the spindle, ferrule bearing and spear.

Fig. 4 is a transverse sectional view taken on the line 4—4 of Fig. 3.

Fig. 5 is a view similar to Fig. 4, showing the bearing formed with additional legs or prongs.

Fig. 6 is a view similar to Fig. 3, the bearing being secured by crimping the end and embedding it in the spindle.

Fig. 7 is a transverse sectional view taken on the line 7—7 of Fig. 6.

Fig. 8 is a view similar to Fig. 6, also showing a slightly different manner of securing, and Fig. 9 is also a transverse sectional view taken on the line 9—9 of Fig. 8.

Fig. 10 is a view similar to Fig. 8, showing a modified construction.

Fig. 11 is a transverse sectional view taken on the line 11—11 of Fig. 10, and

Fig. 12 is a detail end view of the ferrule bearing.

Spindle bearings on shade rollers must withstand all of the torsional strains and twists imposed by the winding mechanisms of the roller without becoming loose and sloppy, and inasmuch as spindles are of limited diameter, the problem of rigidly and securely fastening the bearing in place is of prime importance.

In the drawings I have shown a part sectional assembly of a shade roller and the winding mechanism in which this ferrule bearing is included, however I shall not describe the winding mechanism in detail as this invention is specifically directed to the ferrule bearing and the manner of securing it on the spindle.

The shade roller I have indicated by the numeral 2. This can be of any suitable material, and is centrally bored as shown at 3 to accommodate a spindle 4, one end of said spindle having a sawcut 5, in which one end of the winding spring 6 is anchored, the opposite end of the spring having detachable engagement with a spool member 7, which is in turn provided with a centrally disposed bearing in the usual manner.

A ferrule bearing 8 fits over the opposite end of the spindle and is tubular in shape, the reduced end portion 9 projecting beyond the end of the spindle and serves as a bearing on which the spool 7 is journaled, the inner end 10 being formed with a plurality of legs 11, the extreme end portions 12 of said legs being bent inwardly, so that when assembled on the spindle, they will pierce and be embedded in the wood, the legs proper also being pressed and embedded in the spindle, so that the face thereof is flush with the outer surface of the spindle. A centrally disposed rectangular opening 13 is provided in the outer end of the bearing and accommodates the stem of the spear 14, which is wedged therein, the spear being driven into the end of the spindle, a hub 15 together with the ratchet, (not shown), and spool being first assembled thereon.

Fig. 5 shows identically the same construction with the exception that an additional leg is provided, and it will be clearly obvious that any desired number of legs may be used.

In Figs. 6 and 7 of the drawings, I have shown a slightly different construction, the inner end of the ferrule being crimped or corrugated as shown at 16, the inner folds or valleys being pressed into the spindle, the ridges being flush with the outer surfaces, so that no shoulder is presented on which the spring can catch and hang.

Figs. 8 and 9 also show a slightly different method of securing, the end being pressed into the material, and jagged ears 17 are forced into the wood by piercing the metal with a punch having a uniform or an irregular point, and any number of these ears can be provided to properly secure the ferrule in position.

Figs. 10 and 11 again show a modified form, the extreme inner end 18 being pressed into the spindle to prevent its turning thereon.

Obviously other shapes and designs may be used to secure the ferrule in position, these are however merely modifications, and are no departure from the original idea.

From the foregoing description it will be obvious that I have perfected a very simple, practical, rugged, and substantial ferrule bearing which can be accurately and rigidly secured on a spindle.

What I claim is:—

1. The combination with a spindle, of a stamped shouldered ferrule bearing mounted thereon, the open end section of said ferrule adjacent the shoulder being shaped to pierce said spindle after assembly to prevent rotation of the bearing thereon and provide a smooth continuous surface with the spindle.

2. The combination with a spindle, of a shouldered ferrule bearing non-rotatably mounted thereon, the inner open end section adjacent the shoulder being embedded flush with the outer surface of said spindle to present a smooth continuous surface therewith.

3. The combination with a spindle, of a spindle ferrule bearing mounted thereon and comprising a sheet metal barrel provided with a reduced shouldered bearing section at one end thereof, and integral prongs on the opposite open end of said barrel adapted to be forced into engagement with said spindle after assembly to rigidly secure it in position thereon.

4. The combination with a spindle, of a ferrule mounted thereon and comprising a sheet metal barrel, a bearing section formed intermediate the length thereof, a spear receiving opening in the front end of the barrel, the opposite end being shaped to form inwardly bent integral prong sections adapted to be forced into engagement with the spindle after assembly to prevent rotation of said barrel on the spindle.

In testimony whereof I hereunto affix my signature.

FRED J. BURNS.